United States Patent [19]
Nakamura et al.

[11] Patent Number: 5,387,463
[45] Date of Patent: Feb. 7, 1995

[54] TRANSPARENT PROTECTIVE SUBSTRATE PROVIDED WITH HARD COATING HAVING GLARE REDUCING PROPERTY, METHOD FOR PRODUCING THE SAME AND POLARIZING PLATE

[75] Inventors: Norinaga Nakamura; Yugo Noritake, both of Tokyo, Japan

[73] Assignee: Dai Nippon Printing Co., Ltd., Tokyo, Japan

[21] Appl. No.: 261,222

[22] Filed: Jun. 15, 1994

Related U.S. Application Data

[63] Continuation of Ser. No. 3,970, Jan. 21, 1993, abandoned.

[30] Foreign Application Priority Data

Jan. 24, 1992 [JP] Japan ................................. 4-10882

[51] Int. Cl.⁶ ................................................ B32B 5/16
[52] U.S. Cl. .................................. 428/327; 427/163; 427/164; 427/180; 427/493; 427/494; 427/508; 427/558; 428/331; 428/423.1; 428/446
[58] Field of Search ............. 427/493, 494, 508, 558, 427/163, 164, 180; 428/327, 331, 423.1, 446

[56] References Cited

U.S. PATENT DOCUMENTS 3,933,875  1/1976  Brose et al. ................... 427/493 X

*Primary Examiner*—Bernard Pianalto
*Attorney, Agent, or Firm*—Foley & Lardner

[57] ABSTRACT

The present invention provides a method for producing a triacetyl cellulose film excellent in not only glare reducing property but also transparency and further excellent in the resolution and contrast and, at the same time, having good surface hardness and solvent resistance; a triacetyl cellulose film produced by the method; and a polarizing plate using the triacetyl cellulose film.

A coating composition consisting essentially of a resin bead having a refractive index of 1.40 to 1.60 and an ionizing radiation curing resin composition is coated on a transparent substrate material, and the coated substrate material is irradiated with an ionizing radiation to cure the ionizing radiation curing resin. According to the present invention, when an acetyl cellulose film is used as the transparent substrate material, even though the film is saponified with an alkali, no increase in the haze value occurs and a triacetyl cellulose film provided with a hard coat having a glare reducing property can be obtained. when the ionizing radiation curing resin comprises a polyester acrylate and a polyurethane acrylate, the resultant coating is excellent in the hardness and impact resistance. This film is laminated on a polarizing film to provide a polarizing plate.

13 Claims, 1 Drawing Sheet ically, an object of the present invention is to

TRANSPARENT PROTECTIVE SUBSTRATE PROVIDED WITH HARD COATING HAVING GLARE REDUCING PROPERTY, METHOD FOR PRODUCING THE SAME AND POLARIZING PLATE

This application is a continuation of United States application Ser. No. 08/003,970 filed Jan. 21, 1993, abandoned.

BACKGROUND OF THE INVENTION

The present invention relates to a transparent protective substrate for use in a glare reducing (reflection reducing) treatment of the surface of a polarizing plate used on the surface of a liquid crystal display and the like, a method for producing the same and a polarizing plate using the substrate.

A polarizing plate which serves as a light shutter is provided on the surface of a display such as a liquid crystal display. Since the polarizing plate, as such, has a poor marring resistance, it is protected by a transparent protective substrate such as a glass, a transparent plastic plate or a transparent plastic film. The transparent protective substrate comprising a transparent plastic plate, a transparent plastic film or the like is liable to flawing. For this reason, in recent years, a transparent protective substrate having a surface which was rendered marresistant has been developed. Such a technique is described in, for example, Japanese Patent Laid-Open Publication No. 105738/1989.

This laid-open publication discloses a transparent protective substrate to which marring resistance, chemical resistance and glare reducing property have been imparted, that is, a triacetate film for regulating light. Such a film is used for lamination on a polarizing film to constitute a polarizing plate. In this film, a curing coating comprising an ultraviolet curing epoxyacrylate resin is provided on one surface of an unsaponified triacetate film to form a triacetate film having excellent marring resistance and chemical resistance.

Further, in order to impart a glare shielding property to the above-described film, a resin composition comprising the above-described ultraviolet curing epoxyacrylate resin and an amorphous silica added thereto is coated on the surface of the triacetate film, and the resulting coating is then dried. In the lamination of the resultant triacetate film on a polarizing film to form a polarizing plate, the triacetate film is saponified with an alkali for the purpose of enhancing the adhesion between the triacetate film and a polarizing film and, at the same time, conducting destaticization, and then laminated on the polarizing film to provide a polarizing plate.

In the above-described conventional transparent protective substrate having a glare reducing property, however, a coating of a resin composition containing an amorphous silica is provided on the surface thereof. This coating is formed by coating the surface of the transparent substrate for the purpose of imparting a glare reducing property to the surface of the transparent protective substrate. In order to impart the glare reducing property, silica is incorporated in an amount of 2 parts by weight based on 100 parts by weight of the resin. The coating containing silica according to such formulation causes the transparency to be deteriorated. Further, in this case, when a triacetate film is used as the transparent substrate, the saponification of the silica-containing coating for the purpose of improving the adhesion and, at the same time, conducting destaticization increases the haze value of the resultant triacetate film, which leads to a deterioration in the resolution, contrast and transparency of the film. The haze value is a value expressed in terms of diffused transmission/total light transmission, that is, shows the proportion of diffused light to the whole transmitted light.

SUMMARY OF THE INVENTION

Accordingly, an object of the present invention is to provide a method for producing a transparent protective substrate excellent in not only glare reducing property but also transparency and further excellent in the resolution and contrast and, at the same time, having good surface hardness and solvent resistance, a transparent protective substrate produced by said method, and a polarizing plate using said transparent protective substrate.

Another object of the present invention is to provide a method for producing a transparent substrate free from a deterioration in the haze value, contrast and transparency even upon being saponified particularly when an acetyl cellulose film is used as the transparent substrate material, a transparent protective substrate produced by said method, and a polarizing plate using said transparent protective substrate.

In order to solve the above-described problems, the present invention is characterized in that a transparent protective substrate is produced by coating the surface of a transparent substrate material with a coating composition consisting essentially of a resin bead having a refractive index of 1.40 to 1.60 and an ionizing radiation curing resin composition, irradiating the surface of the uncured coating of the coating composition with an ionizing radiation to cure the coating of the coating composition to form a transparent protective substrate provided with a hard coat having a glare reducing property.

PREFERRED EMBODIMENTS OF THE INVENTION

Figure 1:
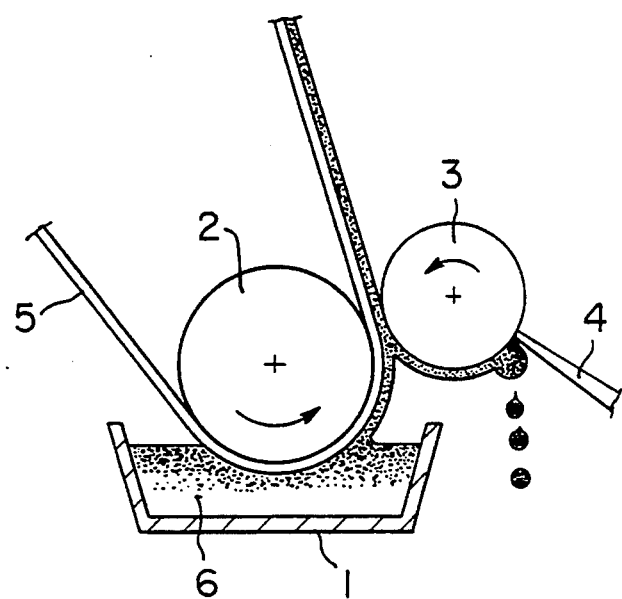
FIG. 1 is a cross-sectional view of an embodiment of a system wherein the method of the present invention is practiced by reverse coating.

Examples of the transparent substrate material include a triacetyl cellulose film, a diacetyl cellulose film, an acetate butyrate cellulose film, a polyether sulfone film, a polyacrylic resin film, a polyurethane resin film, a polyester film, a polycarbonate film, a polysulfone film, a polyether film, a trimethylpentene film, a polyether ketone film and a (meth)acrylonitrile film. Among others, the triacetyl cellulose film is preferably used by virtue of its excellent transparency.

Although the substrate material may be in the form of any of a sheet and a film, the thickness is usually in the range of from about 25 to 1000 μm.

A film forming component used in the ionizing radiation curing resin composition is preferably one having an acrylic functional group, for example, one comprising a substance having relatively low molecular weight such as a polyester resin, a polyether resin, an acrylic resin, an epoxy resin, a urethane resin, an alkyd resin, a spiroacetal resin, a polybutadiene resin, a polythiol polyene resin or an oligomer or a prepolymer of a (meth)acrylate of a polyfunctional compound, such as a polyhydric alcohol, and, incorporated therein as a reactive diluent in a relatively large amount, a monofunctional monomer, such as ethyl (meth)acrylate, ethylhexyl (meth)acrylate, styrene, methylstyrene or N-vinylpyrrolidone and a polyfunctional monomer, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate.

A mixture of a polyester acrylate with a polyurethane acrylate is particularly preferred. The reason for this is as follows. Although the polyester acrylate can provide a very hard coating and therefore is suitable for forming a hard coat, when the polyester acrylate is used alone, the resultant coating has a low impact resistance and is fragile. Therefore, the polyurethane acrylate is used in combination with the polyester acrylate for the purpose of imparting the impact resistance and flexibility to the coating. The proportion of incorporation of the polyurethane acrylate is 30 parts by weight or less based on 100 parts by weight of the polyester acrylate. When the proportion of the polyurethane acrylate exceeds the above-described value, the coating becomes so flexible that the hardness of the coating is unsatisfactory.

A photopolymerization initiator, such as an acetophenone compound, a benzophenone compound, Michler's benzoyl benzoate, α-amyloxime ester, tetramethylthiuram monosulfide or a thioxanthone compound, and a photosensitizer, such as n-butylamine, triethylamine or tri-n-butylphosphine, may be incorporated in the ionizing radiation curing resin composition for the purpose of rendering the ionizing radiation curing resin composition ultraviolet-curing. Among others, in the present invention, it is preferred to incorporate urethane acrylate as the oligomer and dipentaerythritol hexaacrylate as the monomer.

Electromagnetic waves, such as ultraviolet radiation and visible radiation, and charged particle beams, such as an electron beam, may be used as the ionizing radiation.

A resin bead having a refractive index of 1.40 to 1.60 is incorporated in the ionizing radiation curing resin composition for the purpose of imparting a glare reducing property. The reason why the refractive index of the resin bead is limited to the above-described range is as follows. According to the finding of the present inventors, since the refractive index of the ionizing radiation curing resin, particularly an acrylate or methacrylate resin, is usually in the range of from 1.40 to 1.50, the selection of a resin bead having a refractive index close to that of the ionizing radiation curing resin as much as possible enables the glare reducing property to be enhanced without detriment to the transparency of the coating. Among resin beads having a refractive index close to that of the ionizing radiation curing resin, resin beads which can be preferably used in the present invention are listed in Table 1.

TABLE 1

| Name of resin bead | Refractive index |
| --- | --- |
| PMMA (polymethyl methacrylate) bead | 1.49 |
| Polycarbonate bead | 1.58 |
| Polystyrene bead | 1.50 |
| Polyacrylstyrene bead | 1.57 |

TABLE 1-continued

| Name of resin bead | Refractive index |
| --- | --- |
| Polyvinyl chloride bead | 1.54 |

The particle diameter of the resin bead is preferably in the range of from 3 to 8 μm, and the amount of the resin bead is preferably in the range of from 2 to 10 parts by weight based on 100 parts by weight of the resin and usually about 4 parts by weight.

When the above-described resin bead is incorporated in the coating composition, there is a tendency that the resin bead settles at the bottom of a container for the coating composition during coating, the resin bead should be sufficiently dispersed by stirring. In order to avoid such an inconvenience, it is possible to incorporate into the coating composition a silica bead having a particle diameter of 0.5 μm or less, preferably 0.1 to 0.25 μm as a sedimentation preventive for the resin bead in combination with the resin bead. The larger the amount of the silica bead, the better the effect of preventing the settlement or sedimentation of the organic filler. The use of the silica bead in an excessive amount has an adverse effect on the transparency of the coating. For this reason, when the sedimentation preventive is used, the amount thereof is preferably such that the settling of the resin bead can be prevented without detriment to the transparency of the coating, that is, about 0.1 part by weight or less based on 100 parts by weight of the resin.

Further, in order to prevent the electrification of the coating, it is possible to incorporate an antistatic agent into the coating composition for forming a hard coat having glare reducing property used in the present invention. Metallic fillers, tin oxide, indium oxide, etc. may be used as the antistatic agent.

Further, 10 to 100 parts by weight, based on 100 parts by weight of the resin, of a solvent drying-type resin may be incorporated into the coating composition for forming a hard coat having a glare property used in the present invention. The solvent drying-type resin means a resin capable of forming a film by drying a solvent of the resin composition. A thermoplastic resin may be mainly used as the solvent drying-type resin. In particular, when a mixture of a polyester acrylate with a polyurethane acrylate is used in the ionizing radiation curing resin composition, the use of polymethylacrylate methacrylate or polybutylacrylate methacrylate as the solvent drying-type resin is preferred from the viewpoint of the transparency (a low haze value and a high transmission) and compatibility. When a cellulosic resin, such as triacetyl cellulose, is used as the transparent substrate material, it is particularly preferred to use as the solvent drying resin a cellulosic resin, such as nitrocellulose, acetyl cellulose, cellulose acetate propionate or ethylhydroxyethyl cellulose. The reason for this is that the cellulosic resin has a good adhesion to the cellulosic substrate material and, at the same time, neither dissolves nor whitens the cellulosic resin of the transparent substrate material and enables a volatile solvent to be used. In the case of the above-described methacrylic ester polymers, methyl ethyl ketone, ethyl acetate, etc. disadvantageously dissolve and whiten the transparent substrate material of a cellulosic resin.

Advantages offered by the incorporation of the solvent drying-type resin into the ionizing radiation curing resin composition will now be described. When the coating used in the present invention is coated on a transparent substrate material by means of, for example, a roll coater provided with a metering roll, the incorporation of the solvent drying resin in the above-described coating composition consisting essentially of an ionizing radiation curing resin composition can advantageously prevent coating failure during roll coating. Reverse roll coating is shown in FIG. 1. As shown in the drawing, a composition 6 contained in a tray 1 is deposited on a substrate material 5 while feeding the substrate material 5 along a backup roll 2, and passed through between the backup roll 2 and a metering roll 3. On the other hand, the composition deposited on the roll 3 is scraped by means of a doctor 4. The composition deposited on the substrate material is then dried to provide the transparent protective substrate according to the present invention.

The coating composition consisting essentially of an ionizing radiation curing resin composition can be cured by a conventional method of curing an ionizing radiation curing resin composition, that is, by electron beam or ultraviolet irradiation. For example, in the case of curing by means of an electron beam, use may be made of an electron beam having an energy of 50 to 1000 KeV, preferably 100 to 300 KeV, emitted from various electron beam accelerators such as Kockcroft Walton, van de Graaff, resonance transformation, insulation core transformer, linear, dynatron and high frequency and other electron beam accelerators, and in the case of curing by means of an ultraviolet radiation, use may be made of an ultraviolet radiation emitted from light sources such as an extra-high pressure mercury lamp, a high pressure mercury lamp, a low pressure mercury lamp, a carbon arc, a xenon arc and a metal halide lamp.

In the present invention, a polarizing element is laminated on the transparent protective substrate provided with a hard coat having a glare reducing property thus produced to provide a polarizing plate. The polarizing element may be a polyvinyl alcohol film, a polyvinyl formal film, a polyvinyl acetal film, a saponified film of an ethylene/vinyl acetate copolymer, or other film subjected to dyeing with iodine or a dye and stretching. In the laminating treatment, when the transparent protective substrate material is, for example, a triacetyl cellulose film, the triacetyl cellulose film is saponified. The saponification may be conducted before or after applying a hard coat onto the triacetyl cellulose film.

EXAMPLE 100 parts by weight of an ultraviolet radiation curing resin comprising a mixture of a polyester acrylate with a polyurethane acrylate (manufactured and sold by Dainichiseika Color & Chemicals Mfg. Co., Ltd. under a trade name of EXG) was mixed with 37 parts by weight of polymethylacrylate methacrylate as a thermoplastic resin. Further, 4 parts by weight, based on 100 parts of the polymethyl acrylate methacrylate resin, of a polymethyl acrylate methacrylate bead having a particle diameter of 5 $\mu$m was incorporated for the purpose of imparting a glare shielding property. Further, 0.2 part by weight, based on 100 parts by weight, of a silica bead having a particle diameter of 0.25 $\mu$m was incorporated as a settling preventive for the resin bead.

The above-described coating composition was coated on a triacetyl cellulose film by a reverse roll coating method as shown in FIG. 1 so that the coating thickness on a dry basis was 7 $\mu$m.

Then, the coated triacetyl cellulose film was passed through under a 160 W ultraviolet irradiation apparatus at a speed of 10 m/min to cure the resin. Then, the matted, shaped film was peeled off to provide a triacetyl cellulose film having a matted hard coat layer on the surface thereof.

Optical properties of the triacetyl cellulose film thus obtained are given in the following Table 2 in comparison with optical properties of a comparative conventional triacetyl cellulose film wherein a glare reducing property had been imparted by forming a hard coat layer containing a matting agent. The hard coat layer was formed by coating polyester acrylate containing as a matting agent 4 parts by weight, based on 100 by weight of the resin, of a silica having a particle diameter of 5 $\mu$m to form a coating having thickness of 4.5 $\mu$m and irradiating the coated film with an ultraviolet radiation to cure the coating.

TABLE 2

|  | Product of present invention | Conventional product |
|---|---|---|
| Total light beam transmission | 88.2% | 87.3% |
| Diffused light transmission | 8.3% | 17.5% |
| Haze value | 9.0% | 20% |
| 60° gloss value | 74.5% | 52% |

The triacetyl cellulose films to which a glare reducing property had been imparted were saponified for the purpose of imparting the effect of increasing the adhesion between the film and a polarizing element, that is, a polarizing film comprising a polyvinyl alcohol film and, at the same time, imparting the effect of preventing the electrification. The saponified triacetyl cellulose films were each dry-laminated on the polarizing element by means of an adhesive to provide polarizing plates. The haze value of the triacetyl cellulose film after the saponification was 9.4% for the product of the present invention and 22% for the conventional product.

The above-described constitution of the present invention can provide a method for producing a transparent protective substrate excellent in not only glare reducing property but also transparency and further excellent in the resolution and contrast and, at the same time, having good surface hardness and solvent resistance, a transparent protective substrate produced by said method, and a polarizing plate using said transparent protective substrate.

Further, the present invention can provide a method for producing a transparent substrate free from a deterioration of the haze value, contrast and transparency even upon being saponified particularly when an acetyl cellulose film is used as the transparent substrate material, a transparent protective substrate produced by said method, and a polarizing plate using said transparent protective substrate.

What is claimed is:

1. A method for producing a transparent protective article provided with a hard coat having a glare reducing property, comprising the steps of:

coating the surface of a transparent substrate material with an uncured coating composition comprising resin beads having a refractive index of 1.40 to 1.60 and an ionizing radiation curing acrylic resin composition, said resin beads comprising a resin selected from the group consisting of PMMA (polymethyl methacrylate) beads, polycarbonate beads, polystyrene beads, polyacrylstyrene beads and polyvinyl chloride beads; and irradiating the surface of the uncured coating composition with an ionizing radiation to cure the coating to form a hard coat having transparency and a glare reducing property.

2. The method according to claim 1, wherein said coating composition contains less than 0.1 part by weight, based on 100 parts by weight of the acrylic resin, of a silica bead having a particle diameter of 0.5 μm as a sedimentation preventive for the resin bead.

3. The method according to claim 2, wherein said coating composition contains 10 to 100 parts by weight, based on 100 parts by weight of the acrylic resin, of a solvent drying resin.

4. The method according to claim 2, wherein said ionizing radiation curing acrylic resin composition consists essentially of a polyester acrylate and a polyurethane acrylate.

5. A transparent protective article produced by a method according to claim 2.

6. The method according to claim 1, wherein said coating composition contains 10 to 100 parts by weight, based on 100 parts by weight of the acrylic resin, of a solvent drying resin.

7. A transparent protective article produced by a method according to claim 1, 2 or 6.

8. A polarizing plate comprising a polarizing element and, laminated thereon, a transparent protective article according to claim 7.

9. The method according to claim 6, wherein said ionizing radiation curing acrylic resin composition consists essentially of a polyester acrylate and a polyurethane acrylate.

10. A transparent protective article produced by a method according to claim 6.

11. The method according to claim 1 or 2 wherein said ionizing radiation curing acrylic resin composition consists essentially of a polyester acrylate and a polyurethane acrylate.

12. A transparent protective article produced by a method according to claim 11.

13. A method for producing a transparent protective article provided with a hard coat having a glare reducing property, comprising the steps of:

coating the surface of a transparent substrate material with an uncured coating composition consisting essentially of (i) resin beads having a refractive index of 1.40 to 1.60 and (ii) an ionizing radiation curing acrylic resin composition; wherein said resin beads are formed from one or more resins selected from the group consisting of PMMA (polymethyl methacrylate), polycarbonate, polystyrene, polyacrylstyrene and polyvinyl chloride;

irradiating the surface of the uncured coating composition with an ionizing radiation to cure the coating to form a hard coat having transparency and a glare reducing property.

* * * * *